United States Patent [19]

Boeck

[11] Patent Number: 5,346,243
[45] Date of Patent: Sep. 13, 1994

[54] FOLDING TOW BAR APPARATUS AND METHODS

[76] Inventor: Leon Boeck, R.R. 1, Box 138, Easton, Minn. 56025

[21] Appl. No.: 891,404

[22] Filed: May 29, 1992

[51] Int. Cl.$^5$ .............................................. B60D 1/44
[52] U.S. Cl. .............................. 280/478.1; 280/491.1; 280/491.4
[58] Field of Search ............... 280/491.1, 491.4, 401, 280/456.1, 462, 474, 478.1, 477; 403/83, 166

[56] References Cited

U.S. PATENT DOCUMENTS

| | | | |
|---|---|---|---|
| 2,340,540 | 2/1944 | Lange | 403/83 |
| 2,386,195 | 10/1945 | Clark | 280/477 |
| 3,572,765 | 3/1971 | Tieben | 280/491.4 |
| 3,690,482 | 9/1972 | Gaumont | 214/86 A |
| 3,774,949 | 11/1973 | Eger | 293/69 |
| 3,794,355 | 2/1974 | Cracolice | 280/491.4 |
| 3,817,558 | 6/1974 | Eger | 280/491.4 |
| 3,888,516 | 6/1975 | Holt et al. | 280/491.5 |
| 4,013,303 | 3/1977 | Milner | 280/491.4 |
| 4,186,938 | 2/1980 | Youngblood | 280/402 |
| 4,194,755 | 3/1980 | Youngblood | 280/402 |
| 4,577,883 | 3/1986 | Duncan | 280/491.4 |
| 4,768,803 | 9/1988 | Hewitt et al. | 280/462 |
| 4,856,805 | 8/1989 | Davis | 280/491.4 |
| 4,861,061 | 8/1989 | Frantz | 280/479.2 |
| 4,958,847 | 9/1990 | Williams | 280/502 |
| 5,000,473 | 3/1991 | Johnson | 280/491.4 |

FOREIGN PATENT DOCUMENTS

| | | |
|---|---|---|
| 0342262 | 11/1989 | European Pat. Off. . |
| 0452257 | 12/1925 | Fed. Rep. of Germany ... 280/478.1 |
| 2328693 | 1/1975 | Fed. Rep. of Germany . |
| 2450779 | 5/1976 | Fed. Rep. of Germany . |
| 3802726 | 8/1989 | Fed. Rep. of Germany . |
| 8800123 | 8/1989 | Netherlands . |
| 1250481 | 8/1986 | U.S.S.R. . |
| 1293046 | 2/1987 | U.S.S.R. . |
| 1324987 | 7/1987 | U.S.S.R. . |
| 2188015 | 9/1987 | United Kingdom . |
| 2217281 | 10/1989 | United Kingdom . |

Primary Examiner—Mitchell J. Hill
Assistant Examiner—Anne Marie Boehler
Attorney, Agent, or Firm—Merchant, Gould, Smith, Edell, Welter & Schmidt

[57] ABSTRACT

The present invention is a tow bar apparatus and method for use in towing one vehicle with another vehicle. The tow bar apparatus mounts to the front of the first vehicle to be towed via a support. Bendable arms are pivotally attached to the support and extend outward from the support. The free ends of the bendable arms are further pivotally attached to each other. Coupling structure permits attachment of the bendable arms to the second vehicle to tow the first vehicle. Locking structure is provided for selectively locking each of the bendable arms to limit relative rotational movement during towing. If the arms are not locked at the initiation of towing, once the second vehicle begins the towing operation, the locking structure on the bendable arms will automatically lock the apparatus into the towing position. The pivoting structure of the tow bar apparatus permits folded and compact storage on the first vehicle. The pivoting structure further permits unfolding of the apparatus to mount to the second vehicle for towing, without regard to precise positioning of the vehicles. A pivotal mounting of the coupling structure permits further compact storage. Selective locking structure is provided to lock the coupling structure to the bendable arms to limit relative rotational movement during towing and storage.

13 Claims, 8 Drawing Sheets

FOLDING TOW BAR APPARATUS AND METHODS

FIELD OF THE INVENTION

The present invention relates to tow bars and methods for use in attaching a first vehicle to a second vehicle to permit towing of the first vehicle by the second vehicle.

BACKGROUND OF THE INVENTION

In a variety of situations, there is a need for structure which permits attachment of a first vehicle to a second vehicle to permit towing of the first vehicle by the second vehicle. Various conventional tow bar apparatus are known which provide structure for attaching two vehicles together to facilitate towing of the first vehicle by the second. For example, various tow bar apparatus are disclosed in: U.S. Pat. No. 4,856,805, issued Aug. 15, 1989 to Davis; U.S. Pat. No. 4,861,061, issued Aug. 29, 1989 to Frantz; and U.S. Pat. No. 4,577,883, issued Mar. 25, 1986 to Duncan. In these patents, the tow bar structure extends from the first vehicle to permit attachment to a trailer hitch ball of the second vehicle.

A variety of concerns exist with respect to tow bar apparatus and methods of using them. One concern is that some conventional tow bar apparatus are often difficult to use since fairly precise alignment of the first and second vehicles may be required. This can present significant problems if only a single person, the towing vehicle operator, is present during the coupling operation.

Typically, the tow bar structure needs to extend a significant distance from the first vehicle during the towing operation. However, it is important that the tow bar apparatus be useable in such a manner that the structure does not extend from the vehicle too far when the vehicle is not being towed. Any structure extending away from the vehicle body presents a potential danger when the vehicle is being driven in its ordinary manner. This concern relates to whether the tow bar apparatus can be disassembled or otherwise moved in such a way so as to reduce the amount of structure extending from the first vehicle when the tow bar apparatus is not in use. Further, a related concern is that the tow bar apparatus not obstruct a driver's vision in the first vehicle when the tow bar apparatus is not in use. Also, there is a need for an aesthetically pleasing appearance to the tow bar apparatus when the apparatus is not in use so that the device will offer a solution to the problems which consumers will desire for their own use.

In many settings where the tow bar apparatus is stowed away on the vehicle to be towed, only one person may be present for coupling the first and second vehicles together for towing. Similarly, many instances arise where only one person is present when the tow bar apparatus is uncoupled from the towing vehicle. It is important in both of these settings that the tow bar apparatus be easy to assemble from its stowed state to permit coupling, and also be easy to decouple and disassemble to the stowed state. In addition, as noted above, it is important to provide a device which does not need to be precisely aligned with the other vehicle in order to attach the first vehicle to the second.

It will be appreciated, therefore, that there is a need in the art for a tow bar apparatus which addresses at least some of the above concerns, and other concerns in this area.

SUMMARY OF THE INVENTION

According to the present invention, a tow bar apparatus is provided having a support which is mountable to a front of a first vehicle to be towed. First and second arms extend from the support. Each of the first and second arms is pivotally mounted to the support. Third and fourth arms are further provided. Each of the third and fourth arms is pivotally attached to one of the free ends of the first and second arms. The first and third arms, and the second and fourth arms, each cooperate to form a pivoting, bendable arm extending from the support.

The third and fourth arms are further pivotally attached to each other at their respective free ends. Adjacent the pivotal attachment point of the third and fourth arms is coupling structure for permitting attachment of the tow bar apparatus to a second vehicle. The coupling structure may include a conventional trailer tongue. Alternatively, the coupling structure may include a clevis-type coupler. It will be further appreciated that any effective coupling mechanism can be used.

In the preferred embodiment, arm latching, or locking structures are respectively provided for locking the first and third arms, and the second and fourth arms, into a position relative to each other so as to prevent relative rotational movement. Such locking structure is provided for use during the towing operation. The locking structure permits backward movement of the second vehicle to move the towed first vehicle in a backward direction without collapsing the tow bar apparatus into the first vehicle when the locking structures are engaged and the second vehicle is backing up. Also, the locking structure prevents the towed first vehicle from contacting the second vehicle during the towing operation should the second vehicle suddenly slow down in speed and the momentum of the first vehicle urge the first vehicle forward in relation to the second vehicle.

The locking structure between the first and third arms and between the second and fourth arms preferably includes a spring-biased latch structure. In the preferred embodiment, one of the first and third arms includes a slidable member which is spring biased into position to define an enclosed gap. The slidable member permits a projection on the other arm to become automatically positioned in the gap and thus locked into position when a threshold angle of relative rotation is exceeded. In the present invention, this preferably occurs when the first and third arms are both extending in a parallel direction. This preferably occurs either during the coupling operation, or when the towing vehicle begins to pull away from the towed vehicle while the two vehicles are attached with tow bar apparatus. The locking structure between the second and fourth arms is preferably constructed as a mirror image of the locking structure between the first and third arms.

The bendable arms and pivotal connections between the bendable arms and the support permit folding of the tow bar apparatus to a compact stowed position on the first vehicle. When a towing operation is desired, the tow bar apparatus easily unfolds to an extended position. Further, during the attachment process of the first vehicle to the second vehicle, the pivoting structure of the tow bar apparatus permits a fairly large range of relative displacements and angles between the towing vehicle and vehicle to be towed.

To further permit compact storage of the tow bar apparatus, the coupling structure for attachment to the towing vehicle is pivotally mounted to the tow bar apparatus. This permits in-line towing and further permits folding relative to the tow bar apparatus during storage. A latch structure is provided to lock the pivotable coupling structure in one of two position, the in-line towing position, and the stowed position.

In the preferred embodiment, the pivotable mounting of the first and second arms to the support includes three-dimensional pivot structure for permitting three-dimensional pivoting movement of the first and second arms relative to the support. This structure permits vertical displacement of the coupling structure relative to the support during coupling and uncoupling of the tow bar apparatus with the towing vehicle, and also during the towing operation.

A method of towing a first vehicle with a second vehicle is provided including the step of pivotally attaching first ends of first and second bendable arms to the first vehicle to be towed, and then attaching second ends of the first and second bendable arms to the second vehicle to tow the first vehicle. Locking of the first and second bendable arms prevents bending movement during towing of the first vehicle with the second vehicle. Once the first vehicle is towed to the appropriate location, the method includes detaching the second ends of the first and second bendable arms from the second vehicle and pivoting the first and second arms relative to the first vehicle, and further bending the first and second arms to fold the first and second arms into a stowed position. Next, the first and second bendable arms can be locked in the stowed position.

A further method is provided for towing a first vehicle with a second vehicle. A tow bar apparatus is provided with first and second arms pivotally attached to the first vehicle. Third and fourth arms are pivotally attached to each other and to the first and second arms, respectively. The tow bar apparatus is placed in a folded arrangement on the first vehicle. The tow bar apparatus is next placed in an extended arrangement. The method includes interconnecting at least one of the third and fourth arms to the second vehicle, and then towing the first vehicle with the second vehicle.

These and other advantages and features of novelty which characterize with particularity in the claims annexed hereto, informing in part hereof. However, for a better understanding of the invention, its advantages and objects obtained by its use, reference should be made to the drawings which form a further part hereof and to the accompanying descriptive matter in which there is illustrated and described preferred embodiments of the invention.

BRIEF DESCRIPTION OF THE DRAWINGS

In the drawings, in which like reference numerals indicate generally corresponding parts throughout the several views.

DETAILED DESCRIPTION OF THE PREFERRED EMBODIMENTS

Figure 1:
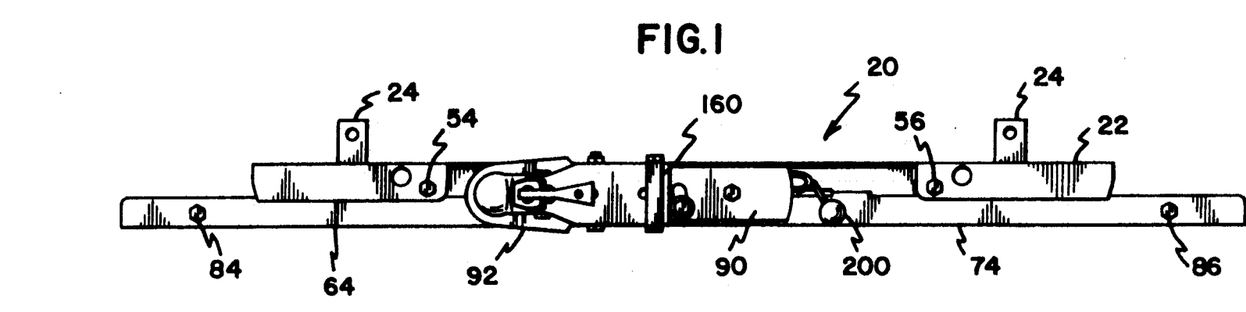
FIG. 1 is a top view of a first embodiment of a tow bar apparatus, in a stowed position, according to the present invention.
Figure 2:
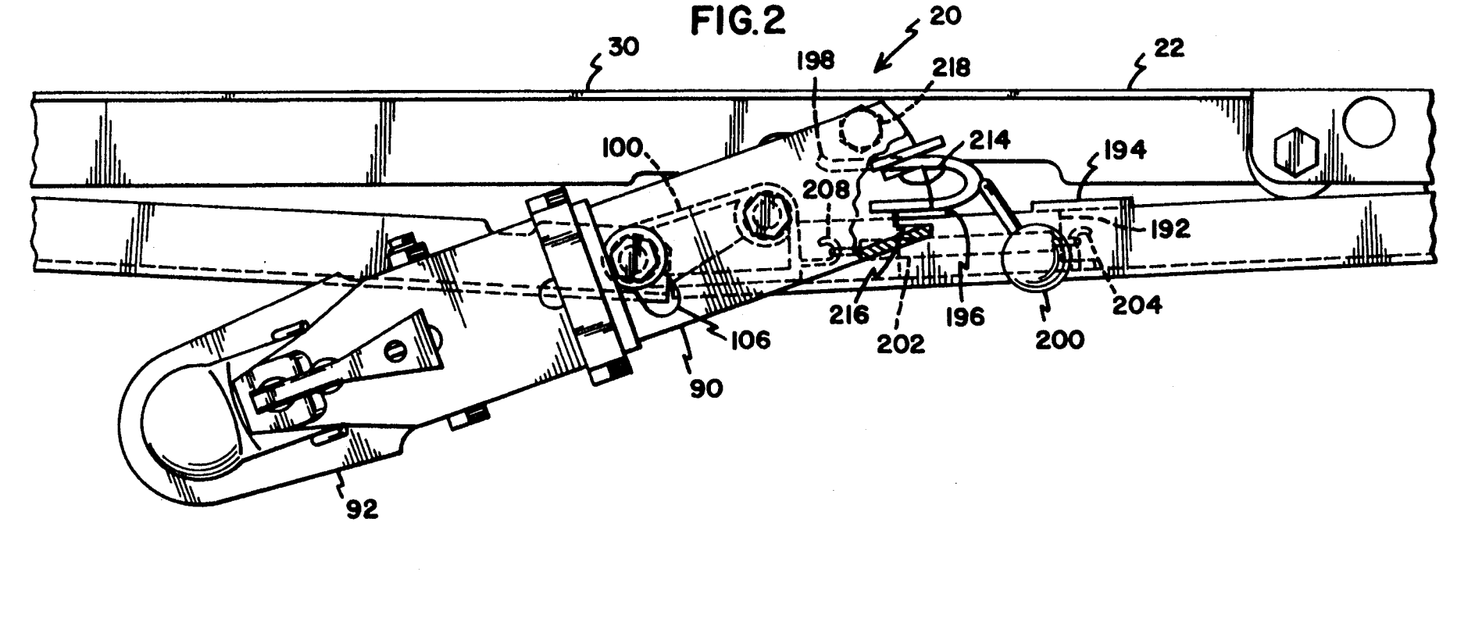
FIG. 2 is an enlarged top view of a portion of the tow bar apparatus shown in FIG. 1, in partial cross-section, and showing the tow bar apparatus partially unfolded between the stowed position and a towing position.
Figure 3:
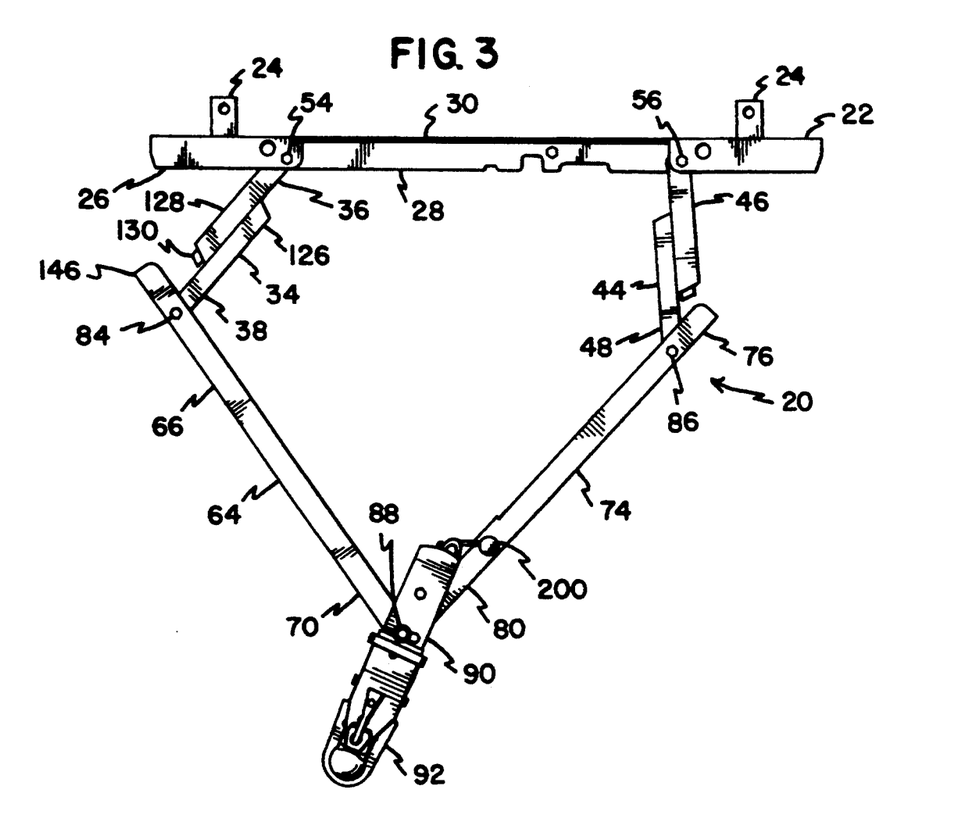
FIG. 3 is a top view of the tow bar apparatus shown in FIG. 1, showing the tow bar apparatus in a further unfolded position between the stowed position and the towing position. The view of FIG. 3 shows the tow bar apparatus closer to the towing position than FIG. 2.
Figure 4:
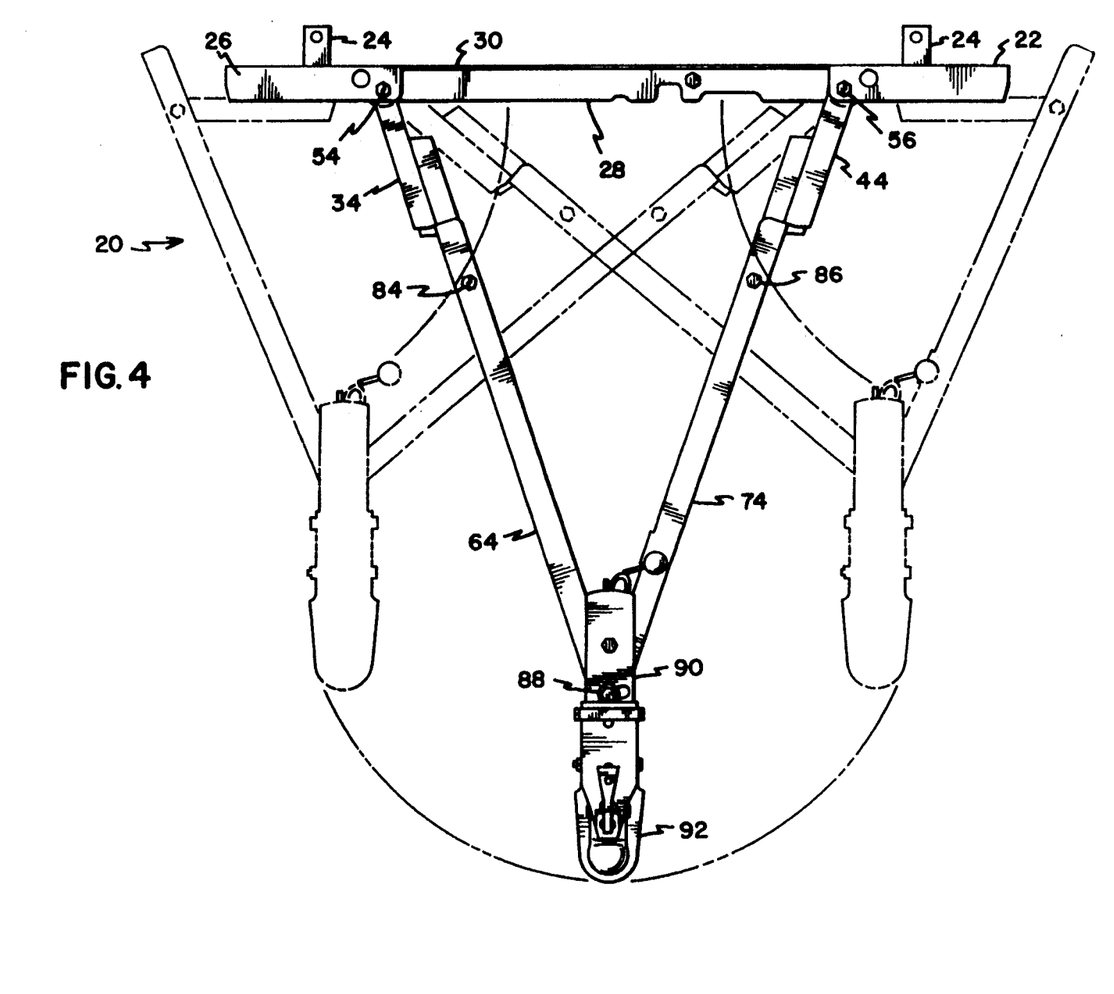
FIG. 4 is a top view of the tow bar apparatus shown in FIG. 1, showing the apparatus in the towing position. Phantom lines also illustrate the possible regions of relative horizontal movement of the coupling end of the tow bar apparatus relative to the support.
Figure 5:
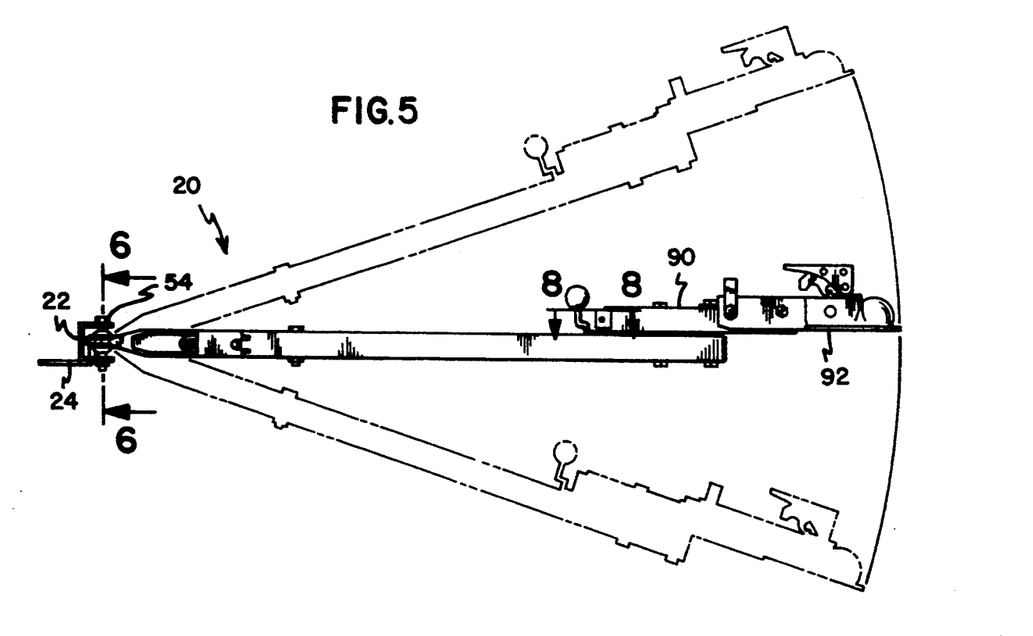
FIG. 5 is a side view of the tow bar apparatus shown in FIG. 4. Phantom lines also illustrate the possible regions of relative vertical movement of the coupling end of the tow bar apparatus relative to the support.

Referring now to the figures, a first preferred embodiment of a tow bar apparatus 20 is shown in FIGS. 1-9. FIG. 1 shows tow bar 20 in a stowed or folded position. This position is typical during use when towing is not desired. FIGS. 4 and 5 show tow bar 20 in a towing position. This position is typical during use when a first vehicle (not shown) is being towed by a second vehicle (not shown).

FIGS. 2 and 3 show tow bar 20 in two different stages of being moved relative to the stowed position shown in FIG. 1 and the towing position shown in FIGS. 4 and 5. It is to be appreciated that the views in FIGS. 2 and 3 represent positions of tow bar 20 during movement of tow bar 20 from the position shown in FIG. 1 to the position shown in FIGS. 4 and 5, and from the position shown in FIGS. 4 and 5 to the position shown in FIG. 1.

FIG. 4 also illustrates in phantom lines various horizontal positions of tow bar 20. FIG. 4 illustrates the potential hookup area during attachment of the first vehicle to the second vehicle provided by the structure of tow bar 20. The potential hookup area relates to the ability of tow bar 20 to permit attachment of the first vehicle to the second vehicle when the first vehicle and the second vehicle are placed in a variety of different relative positions.

FIG. 5 also illustrates in phantom lines various vertical positions of tow bar 20 permitted by the structure of tow bar 20. FIG. 5 illustrates the potential area of vertical movement of tow bar 20 during attachment and detachment of the first vehicle to the second vehicle.

Relative vertical movement between the first vehicle and the second vehicle may also occur during the actual towing operation.

Referring now to FIGS. 1–5, tow bar 20 includes a support 22. Support 22 permits attachment of tow bar 20 to the first vehicle. Support 22 includes a top portion 26 and a bottom portion 28 connected by a back portion 30. Brackets 24 extending from support 22 are one example of structure permitting attachment of support 22 to the first vehicle. Support 22 is preferably made from metal.

Extending from support 22 are first arm 34 and second arm 44, best seen in FIG. 3. A first end 36 of first arm 34 is pivotally attached to support 22 at joint 54. A first end 46 of second arm 44 is pivotally attached at joint 56 to support 22. A pin joint at joint 54, including a bolt and nut, pivotally attaches arm 34 to support 22. Similarly, a pin joint at joint 56, including a bolt and nut, attaches second arm 44 to support 22.

Figure 9:
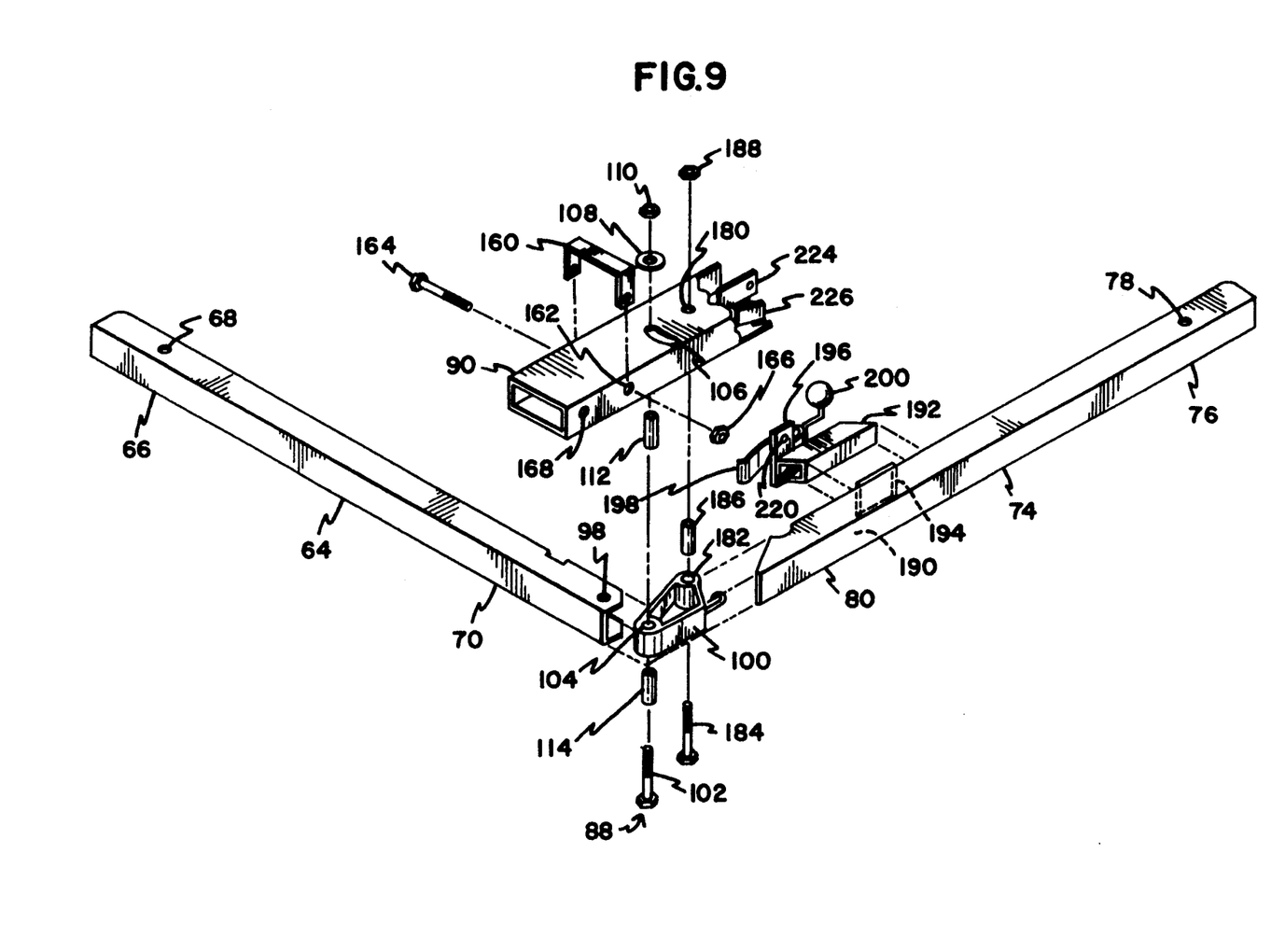
FIG. 9 is an exploded assembly view of the third and fourth arms and a portion of the coupling structure of the tow bar apparatus shown in FIG. 1.

Referring now to FIGS. 1–5 and 9, third arm 64 and fourth arm 74 are provided. Third arm 64 includes a first end 66 pivotally attached to second end 38 of first arm 34. Similarly, fourth arm 74 includes a first end 76 pivotally attached to a second end 48 of second arm 44. Joint 84 provides the pivotal attachment between third arm 64 and first arm 34. Preferably, joint 84 includes a bolt and nut. Joint 86 is the pivotal attachment point between fourth arm 74 and second arm 44, and also preferably includes a bolt and nut. At joint 84 and joint 86, holes 68,78 are provided through third arm 64 and fourth arm 74, respectively, to receive the bolt as part of joint 84,86, respectively, as shown in FIG. 9. Bottom holes are present but not visible beneath top holes 68,78.

Pivot joint 88 pivotally attaches third arm 64 to fourth arm 74 at a second end 70 of third arm 64 and a second end 80 of fourth arm 74. The pivotal attachment of the various arms 34,44,64,74 and support 22 permit a range of motion of ends 70,80 of third and fourth arms 46,74 relative to support 22, as shown in FIGS. 1–4. Preferably, arms 34,44,64,74 and joints 54,56,84,84,88 are made of metal and/or metal parts.

Coupler mounting 90 is connected to fourth arm 74. In the preferred embodiment, coupler mounting 90 is further connected to third arm 64, at joint 88. As shown in FIGS. 1–5, a trailer tongue 92 extends from coupler mounting 90. Trailer tongue 92 permits attachment of tow bar 20 to a trailer ball (not shown) on the second vehicle which tows the first vehicle. Preferably, coupler mounting 90 and the interconnected tongue 92 or other coupling structure is made from metal.

At pivot joint 88, as shown in FIG. 9, holes 98 are provided through third arm 64. A bottom hole is present but not visible beneath top hole 98. An element 100 is attached to second end 80 of fourth arm 74, preferably by welding. Element 100 permits receipt of bolt 102 through hole 104. Bolt 102 further passes through holes 98 before and after passing through hole 104 to mount second end 70 of third arm 64 to second end 80 of fourth arm 74. In addition, bolt 102 attaches to coupler mounting 90 by passing through slot 106. A bottom slot is present but not visible beneath top slot 106. A washer 108, a nut 110 and bushings 112,114 are further provided with respect to pivot joint 88.

Figure 6:
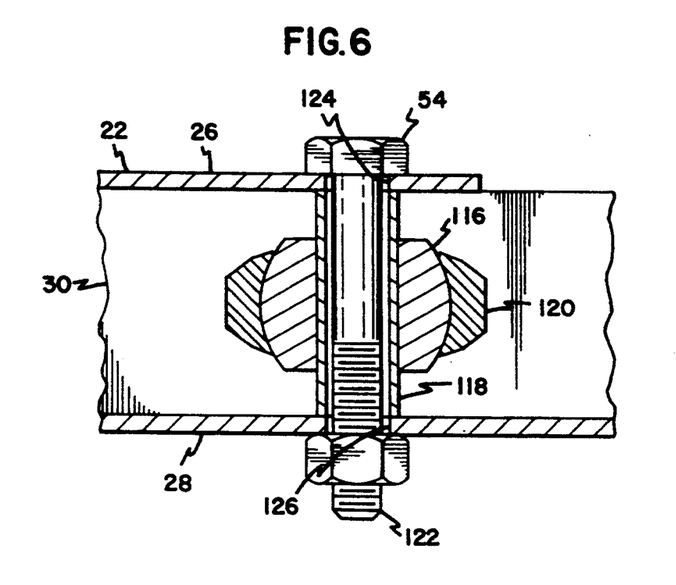
FIG. 6 is an enlarged cross-sectional side view of a portion of the tow bar apparatus shown in FIG. 5 along lines 6—6, showing one of the ball and socket joints in greater detail.

Referring now to FIGS. 5 and 6, aspects of the invention relating to vertical displacement of coupler mounting 90 and trailer tongue 92 relative to support 22 are shown. FIG. 5 illustrates in phantom lines the relative vertical displacement of trailer tongue 92 relative to support 22. Such range of motion is desirable during coupling and decoupling of trailer tongue 92 from the second vehicle which performs the towing operation. Also, such relative vertical displacement capability is desirable during the actual towing operation should one vehicle become vertically displaced relative to the other, such as may occur when the vehicles move over uneven terrain. It is to be appreciated that the structure of support 22 may interfere with vertical displacement of the arms 34,44,64,74 if the tow bar 20 is in a folded or nearly folded state. In other words, some unfolding is necessary to realize the full benefits of the vertical displacement capability.

FIG. 6 shows in greater detail a portion of tow bar 20 at joint 54. The structure permitting vertical displacement includes three dimensional pivoting structure at both pivot joints 54 and 56 (see FIG. 4). Only pivot joint 54 is shown in greater detail in FIG. 6. Pivot joint 56 is substantially similar, or identical, in the preferred embodiment. Joint 54 includes a ball portion 116 which is mounted to tube 118 such that no sliding movement along the longitudinal axis or no rotational movement about the axis relative to tube 118 is possible. Ball portion 116 is freely moveable three-dimensionally, within some structural limitations, within socket portion 120. Socket portion 120 is rigidly attached to first end 36 of first arm 34. As shown in FIG. 6, bolt 122 passes through hole 124 through top 26 of support 22 and through hole 126 through bottom 28 of support 22. In this manner, three dimensional relative pivoting movement between support 22 and first arm 34 is provided. Similarly, joint 56 permits three dimensional relative pivoting movement of second arm 44 relative to support 22.

The present invention includes an arm latching feature which permits latching, or locking, of the arms from pivoting movement during the towing operation. In FIG. 4, tow bar 20 is shown in the towing position. Arms 34,44,64,74 are locked from relative rotational movement relative to each other and to support 22 except for the vertical movement permitted by joints 54,56 as shown in FIG. 5.

Figure 7:
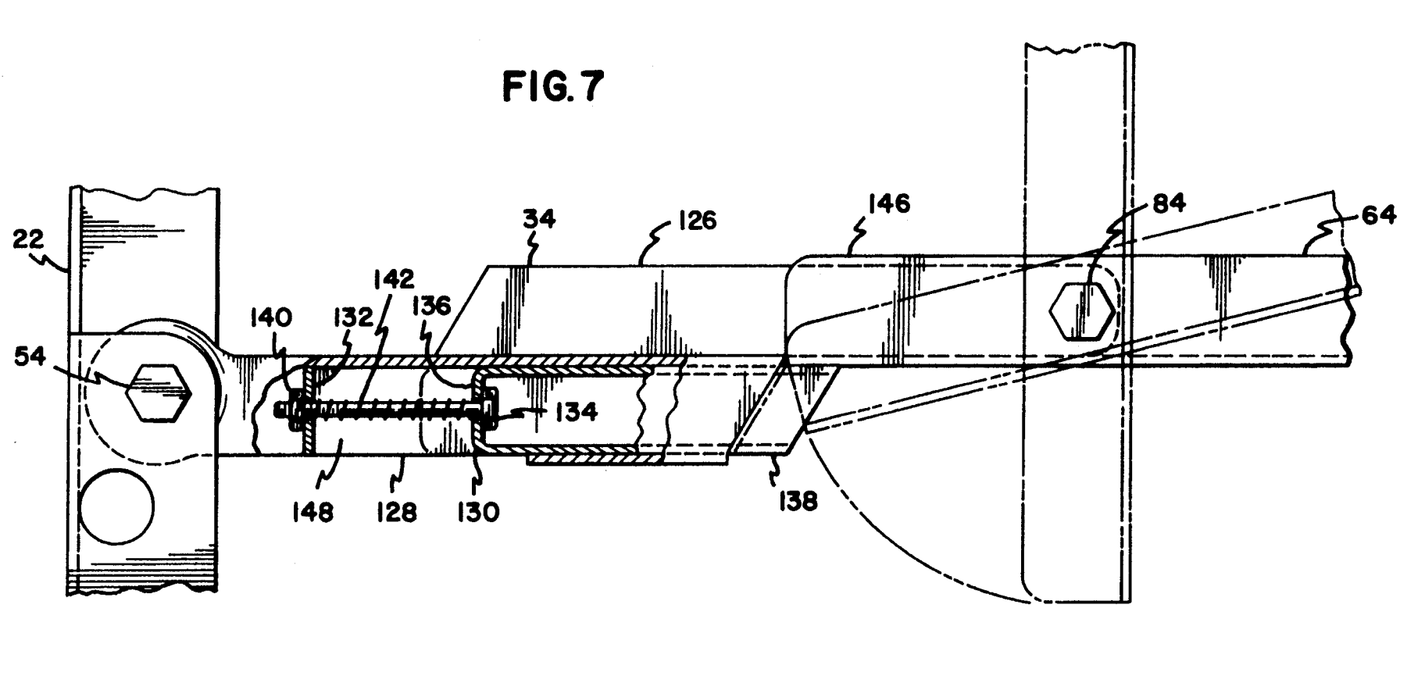
FIG. 7 is an enlarged top view of a portion of the tow bar apparatus shown in FIG. 1, showing one of the arm latches in greater detail and showing portions of the tow bar apparatus removed for illustration purposes. Phantom lines show relative movement of the portions of the apparatus shown.

FIGS. 3, 4, and 7 best illustrate the arm latch structure of the present invention. In the preferred embodiment, two separate arm latch structures are provided. A first arm latch structure locks first arm 34 from relative rotational movement with respect to third arm 64. A second arm latch structure locks second arm 44 from relative rotational movement with respect to fourth arm 74. For the purposes of the present discussion, only the arm latch structure for first arm 34 and third arm 64 will be discussed in detail. The second arm latch structure is substantially similar, or identical, in the preferred embodiment.

Referring now to FIGS. 3 and 7, first arm 34 includes three portions. A first portion 126 attaches to third arm 64 at pivot joint 84. Rigidly attached, preferably welded, to first portion is a third portion 128. It is to be appreciated that third portion 128 may be integrally formed with first portion 126. Third portion 128 attaches to support 22 at joint 54. In the preferred embodiment, third portion 128 defines an enclosed chamber 148 for receiving a second portion 130. Second portion 130 is slidable relative to first portion 126 and third portion 128, as shown in phantom lines in FIG. 7.

Second portion 130 is spring biased toward a first or latched, position. A stop 132 is provided on third portion 128. A bolt 134 extends from a first end 136 of second portion 130 down to stop 132. A nut 140 attaches to bolt 134 and traps a spring 142 between end 136 and stop 132. The length of bolt 134 limits the distance that second portion 130 can travel. FIG. 7 illustrates second portion 130 in the latched position. Phantom lines shown in FIG. 7 illustrate an unlatched position of second portion 130. Spring 142 biases second portion 130 to the latched position.

In the latched position of second portion 130, a gap (see FIG. 3) is formed between second portion 130 and first portion 126. A projection 146 extends from third arm 64. Projection 146 is positioned in the gap in the latched state. Projection 146 is U-shaped in cross-section in the preferred embodiment. Prior to latching, third arm 64 is bent relative to first arm 34 about pivot point 84 as shown in phantom lines in FIG. 7 and also shown in FIG. 3. As first arm 34 becomes parallel with third arm 64, as occurs during coupling or during initiation of the towing operation, projection 146 engages second end 138 of second portion 130 to displace second portion 130 such that projection 146 can access the gap. Once projection 146 accesses the gap, second portion 130 is biased back into the locked, or latched, position. In this manner, automatic latching of first arm 34 and third arm 64 is possible. It is to be appreciated that the three members 126,128,130 could be on third arm 64, and the projection 146 on first arm 34.

Once latched, spring 142 maintains second portion 130 in the latched position. This maintains first arm 34 and third arm 64 in the latched state. In the latched state, no bending is possible. When second arm 44 and fourth arm 74 are also in the latched state, the result is the towing position shown in FIG. 4. This permits forward and backward movement of both vehicles simultaneously during the towing operation based upon the direction of movement of the second vehicle towing the first vehicle.

To unlatch the arm latching structure, second portion 130 is manually pushed from the latched position to the unlatched position against the spring 142. Once second portion 130 is sufficiently displaced, projection 146 is no longer held in place in the gap, and third arm 64 can be pivoted, or bent relative to first arm 34 about pivot joint 84. Unlatching is necessary following the completion of the towing operation and when storage of tow bar 20 is desired in the folded state. Unlatching may also be necessary during the coupling operation should either or both sets of arms become latched prior to proper coupling.

Referring now to FIGS. 2 and 9, coupler mounting 90 is shown in greater detail. As noted, trailer tongue 92 is one of a variety of known coupler structures permitting attachment of tow bar 20 to a second towing vehicle. Handle 160 on coupler mounting 90 provides a convenient structure for grasping coupler mounting 90 to move coupler mounting 90 during coupling and decoupling operations. Further, handle 160 is usable during movement of tow bar 22 from the stowed position to the hookup position or to return tow bar 20 from the towing position to the stowed position. Holes 162 permit attachment of handle 160 to coupler mounting 90 by a bolt 164. A second hole 162 is present on the opposite side of coupler mounting 90, but is not visible in the views shown. Nut 166 mounts to bolt 164. A second set holes 168 receives a second bolt (not shown in FIG. 9). A second hole 168 is present on the opposite side of coupler mounting 90, but is not visible in the views shown. Bolt 164 and the second bolt are used to attach trailer tongue 92 to coupler mounting 90 (see FIG. 2).

Figure 12:
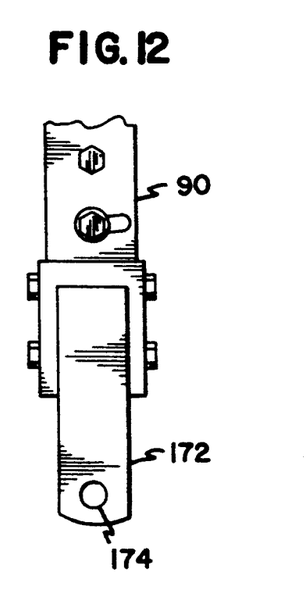
FIG. 12 is a top view of an alternative arrangement for the coupling structure shown in the first preferred embodiment of FIG. 1.

Referring to FIG. 12, an alternative to trailer tongue 92 is shown. In the embodiment of FIG. 12, a clevice coupler is used instead. Clevice couplers typically include a first portion 172 having a hole 174 therein. A second portion mounted to the vehicle (not shown) typically includes a hole which aligns with hole 174. A peg or pin (not shown) is inserted into hole 174 and the accompanying hole extending from the second portion from the towing vehicle. FIG. 12 is one example of an alternative arrangement for permitting attachment of tow bar 20 to the second towing vehicle. Other arrangements are possible in accordance with the present invention.

During the towing operation, it is important that coupler mounting 90 and trailer tongue 92 remain in the position shown in FIG. 4 relative to the remainder of tow bar 22. In other words, a rigid, in-line mounting of coupler mounting 90 relative to pivot joint 88 is important. However, an immovably rigid connection between coupler mounting 90 and the remaining structure of tow bar 20 would not permit as efficient folding for storage. FIG. 2 illustrates a partially folded position of tow bar 20. As shown in FIG. 2, an end of trailer tongue 92 protrudes away from support 22. This position is nearly the limiting position for folding tow bar 20 shown if additional structure is not provided to permit further folding. Coupler 90 is further preferably provided with structure permitting pivoting movement of coupler 90 relative to the connection point at joint 88.

Figure 8:
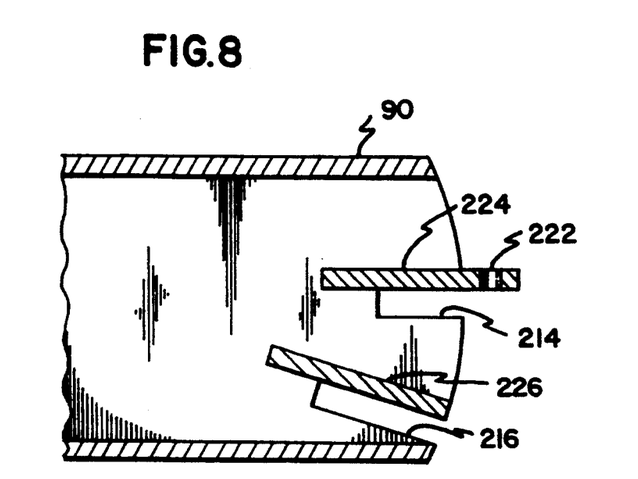
FIG. 8 is an enlarged cross-sectional top view of a portion of the coupling structure of the tow bar apparatus shown in FIG. 1, along lines 8—8 of FIG. 5.

Referring now to FIGS. 2, 8, and 9, a second set of holes 180 are provided through coupler mounting 90. Element 100 includes a second hole 182 for receiving a bolt 184. Bolt 184 is further inserted through holes 180 in coupler mounting 90. A second hole 180 is present on the opposite side of coupler mounting 90, but is not visible in the views shown. A bushing 186 and a nut 188 are also provided. Bolt 184 defines a pivot axis of coupler mounting 90 relative to fourth arm 74. Limited pivoting movement is provided due to slot 106. Limited pivoting movement of coupler mounting 90 permits tow bar 20 to be folded from the position shown in FIG. 2 to the position shown in FIG. 1.

During operation, a pivoting coupler mounting 90 relative to fourth arm 74 is not desirable. Further, it is desireable to maintain coupler mounting 90 and trailer tongue 92 in an in-line centered position, like that shown in FIG. 4. To selectively limit rotational movement of coupler mounting 90 during the towing operation, coupler latching structure is provided, as best shown in FIGS. 2, 8, and 9. Positioned in a chamber 190 on fourth arm 74 is a sliding tube 192. A guide plate 194 maintains sliding tube 192 in chamber 190. Sliding tube 192 is moveable within fourth arm 74 in a direction toward first end 76 of fourth arm 74 and in a direction of second end 80 of fourth arm 74.

Attached to sliding tube 192 is a vertical finger 196 and a horizontal finger 198. Handle 200 permits grasping by the hand to move the sliding tube 192 between positions. A spring 202 biases sliding tube 192 toward second end 80 of fourth arm 74, to a latched position. Hook 204 on sliding tube 192 attaches to first bent end of spring 202. Hook 208 on element 100 attaches to a second bent end of spring 202.

Vertical finger 196 of sliding tube 192 engages structure on coupler mounting 90 for maintaining coupler mounting 90 in two different positions. As best shown in FIGS. 2 and 9, a first slot 214 is provided for receiving vertical finger 196. When so engaged, coupler mounting 90 is in the latched position of FIG. 1 relative to fourth arm 74. This position is not an in-line towing position, but an in-line stowed position. FIG. 4 illustrates an in-line towing position.

If vertical finger 196 were in slot 214 with the positions of arms 34,44,64,74 of FIG. 4, coupler 90 would extend generally parallel to fourth arm 74. This is not a desirable towing position. To position coupler mounting 90 in a more desirable towing position, sliding tube 192 is moved sufficiently away from coupler mounting 90 to permit vertical finger 196 to disengage slot 214.

Once vertical finger 196 is disengaged from slot 214, coupler mounting 90 is rotatable freely relative to fourth arm 74. Once coupler mounting 90 is rotated in a counterclockwise direction from the position of FIG. 1 to the position of FIG. 2, sliding tube is returned to the latched position which permits vertical finger 196 to be positioned in slot 216. This locks coupler mounting 90 into the towing position. Spring 202 maintains vertical finger 196 in a locked state relative to slot 216. A second vertical member 226 is mounted to coupler mounting 90 adjacent slot 216 to help provide secure positioning of coupler mounting 90 in the towing position relative to arm 74.

An additional feature of the invention relates to a structure for locking tow bar 22 into the position shown in FIG. 1, the stowed position. Extending from sliding tube 192 is the horizontal finger 198. Horizontal finger 198 is shown in FIG. 2 in an unlocked position relative to support 22. Locking pin 218 extends upward from bottom member 28 of support 22. In the locked position, horizontal finger 198 is positioned between locking pin 218 and back 30 of support 22. This prevents the arms 34,44,64,74 from unfolding toward the towing position. Also, a hole 220 in vertical finger 196 aligns with hole 222 in vertical member 224 mounted to coupler mounting 90. By aligning the holes 220,222 and inserting a bail arm of a padlock (not shown), tow bar 20 can be securely maintained in the stowed position. The padlock would prevent tampering or unauthorized use of tow bar 20.

In operation, tow bar 20 may be initially in the folded or stowed state as shown in FIG. 1. To unfold, the left hand of the operator may be used to push in on coupler mounting 90 to relieve tension on sliding bar 192. The right hand may be used to pull handle 200 to the right to release horizontal finger 198 of sliding tube 192 from locking engagement with pin 218, and also to remove vertical finger 196 from engagement with slot 214. The left hand may then be used to grasp handle 160 and pull coupler mounting 90 toward the operator. While sliding tube 192 is still released from engagement with slot 214, coupler mounting 90 is pivoted counterclockwise as viewed from above to the towing position shown in FIG. 2. Handle 200 can be released wherein spring 202 biases sliding tube toward an engagement position where vertical finger 196 engages slot 216.

If the vehicle to be towed is sufficiently close to the towing vehicle, i.e. within the range of possible hookup locations, then the operator can couple the trailer tongue 92 to the towing vehicle. By moving the first vehicle (vehicle to be towed) backward or moving the second vehicle (towing vehicle) forward, arms 34,44,64,74 should straighten and latch automatically into place. In some instances, manual assistance of the latching mechanisms may be necessary by merely pushing slightly adjacent pivot Joints 84,86 to straighten the joints.

Once the towing operation is complete, and it is desired to return tow bar 20 to the stowed position, trailer tongue 92 is removed from coupling engagement with the second vehicle. Next, each of the arm latches are released. This can be accomplished by pushing second end 138 of the sliding second member 130 of first arm 34 to release projection 146 from being locked in the gap. By bending arms 34 and 64 relative to each other, projection 146 will be moved sufficiently to no longer be in a position to be automatically locked when sliding second member 130 is biased back by spring 142. The same steps are followed to release the arm latch with respect to arms 44,74.

Next, coupler mounting 90 is pushed toward support 22. Handle 200 is grasped to remove vertical finger 196 from slot 216, thereby permitting rotation of coupler mounting to the stowed position relative to fourth arm 74. Handle 200 is released, wherein vertical finger 196 engages slot 214, and horizontal finger 198 is positioned between pin 218 and back 30 of support 22. A padlock can be inserted through holes 220,222 to securely lock the tow bar 20 from tampering or unauthorized use.

Figure 10:
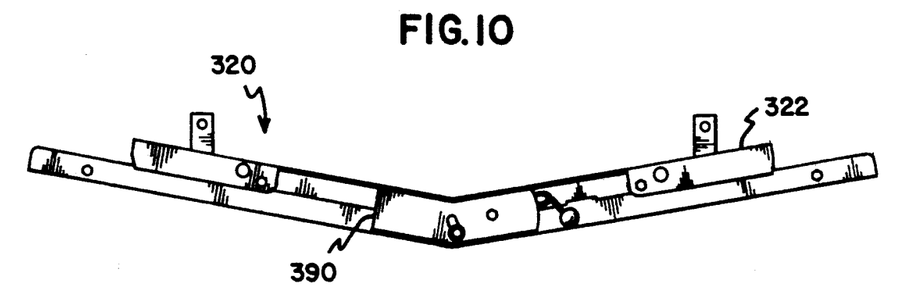
FIGS. 10 and 11 are top views of a second preferred embodiment of a tow bar apparatus in accordance with the present invention, for use with V-shaped vehicles.
Figure 11:
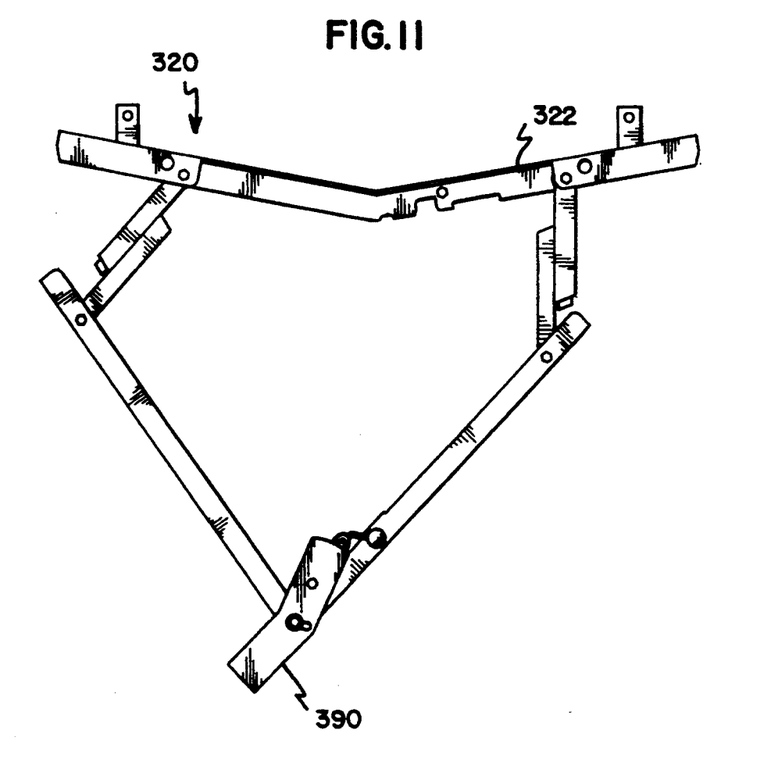

Referring now to FIGS. 10 and 11, a second embodiment of tow bar apparatus 320 is shown. The second embodiment of FIGS. 10 and 11 is similar in many respects to tow bar 20 described in FIGS. 1-9. Tow bar 320 is different in that it is for a V-front vehicle which is to be towed. Tow bar 320 includes a V-shaped support 322 and a V-shaped coupler mounting 390. The V-shaped modifications permit more compact folding in the stowed state than would otherwise be possible with the tow bar 20, in the case of vehicles with V shapes on the front.

The present invention provides a tow bar apparatus that is fast and easy to connect the two vehicles for towing. The present invention also permits hookup by a single person. The bendable arms allow a large hookup area and also allows for compact folding for storage. In the preferred embodiment, tow bar 20 has a hookup area of 400 or more square inches where the two vehicles may be positioned relative to one another.

The tow bar further folds compactly for safe stowing on the towed vehicle when not in use. The tow bar of the present invention folds compactly for storing below the bumper or else folds partially to a specially designed grill or brush guard (not shown). The folded or stowed position is further aesthetically pleasing. Moreover, the folded tow bar does not interfere with the first driver's vision when the first vehicle is driven. Also, the tow bar can be easily installed and/or removed from the vehicle to be towed.

It is to be understood, that even though numerous characteristics and advantages of the invention have been set forth in the foregoing description, together with details of the structure and function of the invention, the disclosure is illustrative only, and changes may be made in detail, especially in matters in shape, size, and arrangement of the parts within the principles of the invention to the full extent indicated by the broad general meaning of the terms in which the appended claims are expressed.

What is claimed is:

1. A tow bar apparatus mountable on a first vehicle for attachment to a second vehicle, said tow bar apparatus comprising:

a support mountable to the first vehicle to be towed;

a first arm with first and second ends;

first pivot means for pivotally mounting the first end of the first arm to the support;

a second arm with first and second ends;

second pivot means for pivotally mounting the first end of the second arm to the support;

a third arm with first and second ends;

third pivot means for pivotally mounting the second end of the first arm to the first end of the third arm;

a fourth arm with first and second ends;

fourth pivot means for pivotally mounting the second end of the second arm to the first end of the fourth arm;

fifth pivot means for pivotally mounting the second end of the third arm to the second end of the fourth arm;

coupling means interconnected with at least one of the third and fourth arms for attaching the tow bar apparatus to the second vehicle to tow the first vehicle, wherein the coupling means is pivotally moveable relative to both the third and fourth arms; and means for selectively locking the coupling means to one of the third and fourth arms in a first position and in a second position for preventing relative rotational movement between the coupling means and the third or fourth arm, the first position locking the coupling means in a vehicle towing position for use in towing the first vehicle, the second position locking the coupling means in an apparatus stowing position for use in stowing the tow bar apparatus on the first vehicle, wherein the means for selectively locking includes:

a finger slidably mounted to one of the third and fourth arms;

a plate extending from the coupling means, the plate having a first slot and a second slot, each of the first and second slots alternatively receiving the finger, the finger received by the first slot when the coupling means is in the first position, the finger received by the second slot when the coupling means is in the second position, the finger being moveable away from the first and second slots to move the finger between the first and second slots as the finger and the plate are pivotally moved relative to one another; and spring means for biasing the finger toward the plate.

2. The apparatus of claim 1, further comprising:

first lock means for selectively locking said third pivot means to prevent relative rotational movement between the first arm and the third arm; and second lock means for selectively locking said fourth pivot means to prevent relative rotational movement between the second arm and the fourth arm.

3. The apparatus of claim 2, wherein said first lock means include spring biased lock means for locking the first and third arms from relative rotational movement when a threshold angle of relative rotation is exceeded.

4. The apparatus of claim 2, wherein said first lock means include:

a first member;

a second member slidably mounted to the first member;

spring means for biasing the second member toward a first position to define a gap between the first and second members, the second member moveable to a second position to provide access to the gap;

the first member, the second member, and the spring means forming at least a portion of the first or third arms;

the other of the first or third arms including a projection which is positionable in the gap to lock the first and third arms from relative rotational movement;

the projection being moveable toward a gap during relative rotational movement of the first and third arms subsequent to locking, the projection further being slidably engageable with the second member to slidably move the second member to the second position wherein the projection is positionable relative to the gap such that said spring means biases the second member toward the first position to lock the first and third arms from relative rotational movement.

5. The apparatus of claim 1, wherein said first and second pivot means each include three-dimensional pivot means for permitting three-dimensional pivoting relative movement between each of the respective first and second arms and the support.

6. The apparatus of claim 5, wherein each of said three-dimensional pivot means include a ball and socket joint.

7. The apparatus of claim 1, wherein said third, fourth, and fifth pivot means each include a pin pivot.

8. The apparatus of claim 1, wherein said coupling means include a trailer tongue.

9. The apparatus of claim 1, wherein said coupling means include one end of a clevis coupler.

10. The tow bar apparatus of claim 1, wherein the coupling means includes a coupling projection having an end for engaging the second vehicle, the coupling projection being pivotally moveable relative to both of the third and fourth arms, the selective locking means locking the coupling projection to one of the third and fourth arms, the end of the coupling projection configured and arranged to extend parallel to at least one of the third and fourth arms when the coupling means is in the apparatus stowing position, and the end of the coupling projection extending in a non-parallel direction to both the third and fourth arms when the coupling means is in the vehicle towing position.

11. A tow bar apparatus mountable on a first vehicle for attachment to a second vehicle, the tow bar apparatus comprising:

a support mountable to the first vehicle;

two jointed arms each pivotally mounted to the support at one end of each arm and to each other at an opposite end of each arm;

coupling means interconnected with at least one of the jointed arms adjacent the opposite ends of the jointed arms for attaching the tow bar to the second vehicle; and lock means associated with each jointed arm for selectively locking each of the jointed arms, each of the lock means including:

a first member;

a second member with opposing portions, the second member rigidly mounted to the first member;

a third member slidably mounted between the opposing portions of the second member, the third member being slideably moveable in a longitudinal direction relative to the second member, an end of the third member including an angled surface at an angle less than 90° relative to the longitudinal direction;

spring means for biasing the third member toward the first position to define a gap between the first member and the third member, the third member moveable in the longitudinal direction against the biasing means to a second position to provide access to the gap; and a projection pivotally mounted to the first member, the projection including an end portion with a U-shaped cross-section with two end legs and a middle leg between the end legs, the middle leg being positionable in the gap to lock the projection from movement relative to the first arm, the projection and the first member forming pivotal portions of the jointed arm, the projection being moveable toward the gap during relative rotational movement of the projection and the first member subsequent to locking of the jointed arm, the middle leg of the projection further being slidably engageable with the angled surface of the third member during relative rotational movement of the projection and the first member subsequent to locking of the jointed arm to slidably move the third member to the second position wherein the middle leg of the projection is positionable relative to the gap such that the spring means biases the third member toward the first position to lock the projection and the first member from relative rotational movement, the first member positioned between the end legs of the projection in the locked position.

12. A tow bar apparatus mountable on a first vehicle for attachment to a second vehicle, the tow bar apparatus comprising:

a V-shaped support mountable to the first vehicle, the V-shaped support including a first leg mountable on one side of the front of the first vehicle and a second leg mountable on an opposite side of the front of the first vehicle, the first leg and the second leg intersecting one another to define a V-shape;

two jointed arms each pivotally mounted to the V-shaped support at one end of each arm and to each other at an opposite end of each arm, each arm including a lock arrangement for selectively locking the jointed arm in an extended position;

coupling means interconnected with at least one of the jointed arms for attaching the tow bar to the second vehicle, the coupling means including a V-shaped coupling projection having an end configured and arranged for engaging the second vehicle, the V-shaped coupling projection pivotally mounted to at least one of the jointed arms for pivoting relative movement with respect to both jointed arms, the coupling means including means for selectively locking the V-shaped coupling projection relative to at least one of the jointed arms in two different positions for preventing relative rotational movement between the coupling means and the jointed arm or arms the V-shaped coupling projection is mounted to.

13. A tow bar apparatus mountable on a first vehicle for attachment to a second vehicle, said tow bar apparatus comprising:

a support mountable to the first vehicle to be towed;

a first arm with first and second ends;

first pivot means for pivotally mounting the first end of the first arm to the support;

a second arm with first and second ends;

second pivot means for pivotally mounting the first end of the second arm to the support;

a third arm with first and second ends;

third pivot means for pivotally mounting the second end of the first arm to the first end of the third arm;

a fourth arm with first and second ends;

fourth pivot means for pivotally mounting the second end of the second arm to the first end of the fourth arm;

fifth pivot means for pivotally mounting the second end of the third arm to the second end of the fourth arm;

first lock means for selectively locking said third pivot means to prevent relative rotational movement between the first arm and the third arm, wherein said first lock means includes:

a first member;

a second member slidably mounted to the first member;

spring means for biasing the second member toward the first position to define a gap between the first and second members, the second member moveable to a second position to provide access to the gap;

the first member, the second member, and the spring means forming at least a portion of the first or third arms;

the other of the first or third arms including a projection which is positionable in the gap to lock the first and third arms from relative rotational movement; and the rotational being moveable toward the gap during relative rotational movement of the first and third arms subsequent to locking, the projection further being slidably engageable with the second member to slidably move the second member to the second position wherein the projection is positionable relative to the gap such that said spring means biases the second member toward the first position to lock the first and third arms from relative rotational movement;

second lock means for selectively locking said fourth pivot means to prevent relative movement between the second arm and the fourth arm;

coupling means interconnected with at least one of the third and fourth arms for attaching the tow bar apparatus to the second vehicle to tow the first vehicle, wherein the coupling means is pivotally moveable relative to both the third and fourth arms; and means for selectively locking the coupling means to one of the third and fourth arms in a first position and in a second position for preventing relative rotational movement between the coupling means and the third or fourth arm, the first position locking the coupling means in a vehicle towing position for use in towing the first vehicle, the second position locking the coupling means in an apparatus stowing position for use in stowing the tow bar apparatus on the first vehicle.

* * * * *

UNITED STATES PATENT AND TRADEMARK OFFICE
CERTIFICATE OF CORRECTION

PATENT NO. : 5,346,243
DATED : September 13, 1994
INVENTOR(S) : Leon Boeck

It is certified that error appears in the above-indentified patent and that said Letters Patent is hereby corrected as shown below:

Column 14, line 36, "rotational" should read --projection--.

Column 14, line 47, insert --rotational-- after the word "relative".

Signed and Sealed this

Third Day of January, 1995

Attest:

BRUCE LEHMAN

*Attesting Officer*          *Commissioner of Patents and Trademarks*